(12) United States Patent
Pan (10) Patent No.: US 11,477,241 B2
(45) Date of Patent: Oct. 18, 2022

(54) SELECTIVELY DISABLING ANTI-REPLAY PROTECTION BY A NETWORK SECURITY DEVICE

(71) Applicant: Fortinet, Inc., Sunnyvale, CA (US)

(72) Inventor: Yixin Pan, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 139 days.

(21) Appl. No.: 16/729,853

(22) Filed: Dec. 30, 2019

(65) Prior Publication Data
US 2021/0203698 A1    Jul. 1, 2021

(51) Int. Cl.
*H04L 29/06*    (2006.01)
*H04L 9/40*    (2022.01)
*H04L 41/0893*    (2022.01)

(52) U.S. Cl.
CPC .......... *H04L 63/20* (2013.01); *H04L 41/0893* (2013.01); *H04L 63/0236* (2013.01); *H04L 63/0263* (2013.01); *H04L 63/0428* (2013.01); *H04L 63/1466* (2013.01)

(58) Field of Classification Search
CPC . H04L 63/20; H04L 63/0236; H04L 63/0263; H04L 63/0428; H04L 63/1466; H04L 41/0893
See application file for complete search history.

(56) References Cited

U.S. PATENT DOCUMENTS

| | | | | |
|---|---|---|---|---|
| 8,646,090 | B1 * | 2/2014 | Gadde ................. | H04L 12/6418 726/26 |
| 9,531,624 | B2 * | 12/2016 | Modi ...................... | H04L 45/28 |
| 2003/0061507 | A1 * | 3/2003 | Xiong ................. | H04L 63/0227 726/14 |
| 2006/0239218 | A1 * | 10/2006 | Weis .................... | H04L 63/1458 370/312 |
| 2009/0190585 | A1 * | 7/2009 | Allen .................... | H04L 63/168 370/390 |
| 2009/0328219 | A1 * | 12/2009 | Narayanaswamy .... | H04L 63/20 726/23 |
| 2015/0237069 | A1 * | 8/2015 | Rochon ................. | H04L 63/164 726/4 |
| 2016/0072717 | A1 * | 3/2016 | Ansari ................... | H04L 45/24 370/412 |
| 2016/0080505 | A1 * | 3/2016 | Sahin .................. | H04L 67/1027 709/229 |

\* cited by examiner

*Primary Examiner* — Vance M Little
(74) *Attorney, Agent, or Firm* — Law Office of Dorian Cartwright; Dorian Cartwright (57) ABSTRACT

Systems and methods for selectively disabling anti-replay security checks based on a defined network policy that can override the globally-defined defaults for specific network sessions are provided. A network security device protecting a private network receives a packet associated with a network traffic flow between a source computing device and an internal destination computing device. The network security device identifies an anti-replay policy associated with the network traffic flow and whether the anti-replay policy is intended to override a global anti-replay policy of the network security device. When the identifying is affirmative, the network security device performs one or more anti-replay security checks in accordance with the anti-replay policy. When the identifying is negative, the network security device performs the one or more anti-replay security checks in accordance with the global anti-replay policy.

15 Claims, 6 Drawing Sheets

| Identity | Source Address | Destination Address | Action | Anti-replay |
|---|---|---|---|---|
| 1 | Robots | Any | Accept | Disable |
| 2 | Internal | Internet | Accept | Default |

SELECTIVELY DISABLING ANTI-REPLAY PROTECTION BY A NETWORK SECURITY DEVICE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2019, Fortinet, Inc.

BACKGROUND

Field

Embodiments of the present invention generally relate to the field of network security. In particular, embodiments of the present invention relate to a network security device that selectively disables anti-replay security checks based on a defined network policy for a specific network session.

Description of the Related Art

In communication networks, anti-replay security checks enable an Internet Protocol (IP) security feature that detects instances in which a packet exchanged between a source and a destination may have been intercepted and then replayed or reused by an attacker based on whether the packet's Transmission Control Protocol (TCP) sequence number is within the expected range. These checks are generally defined for all sessions at a global level by a global policy table, for example, that controls how a network security device globally performs security checks on packets traversing the network security device. The network security device may loosely or tightly perform the anti-replay check or may not perform the check at all, but all sessions currently receive the same treatment.

Some automated processes, such as web-crawlers or robots, implement a non-standard TCP stack. For example, traffic, with a non-zero ACK number and without the ACK flag set, produced by an automated process will be discarded if the anti-replay checks are enabled. While disabling the anti-replay checks would allow such non-standard traffic to pass through a network security device, such an approach, because the settings are at a global level, exposes the protected network to replay attacks by sessions for which it would be desirable to continue performing the anti-replay checks. Therefore, there is a need for greater granularity of control in relation to anti-replay security protection.

SUMMARY

Systems and methods are described for selectively disabling anti-replay security checks based on a defined network policy that can override the globally-defined defaults for specific network sessions. According to an embodiment, a network security device protecting a private network, receives a packet associated with a network traffic flow between a source computing device and a destination computing device within the private network. In response to receipt of the packet from the source computing device, the network security device determines whether the packet is a first packet of the network traffic flow observed by the network security device. When the determining is affirmative, then the network security device identifies an anti-replay policy associated with the network traffic flow and whether the anti-replay policy is intended to override a global anti-replay policy of the network security device. When the identifying is affirmative, then the network security device performs one or more anti-replay security checks in accordance with the anti-replay policy while, when the identifying is negative, then the network security device performs the one or more anti-replay security checks in accordance with the global anti-replay policy.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for selectively disabling anti-replay security checks based on a defined network policy that can override the globally-defined defaults for specific network sessions. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrases "network security device" or "security device" generally refer to a hardware or virtual device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, anti-spam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like. According to one embodiment, a management appliance associated with an enterprise network that manages the network security devices associated with the enterprise network incorporates the SDWAN controller functionality described herein and the network security devices operate as edge devices and/or hub devices in accordance with roles assigned to them by the management appliance.

The phrase "packet" is a unit of data that is routed between a source computing device and a destination computing device over the Internet or any other packet-switched network, e.g., Transmission Control Protocol/Internet Protocol (TCP/IP) network. E-mails, web pages, web applications and the like use packets to transmit information back and forth between server and computing devices of users. A packet additionally includes an indication of the source computing device and the destination computing device and network protocols.

The phrase "network traffic flow" or "network flow" is flow of a sequence of packets from a source computing device to a destination computing device. When information, in the form of a file (e.g., an e-mail message, an HTML file, a GIF file) or otherwise is transmitted from the source to the destination over a network, the TCP layer of TCP/IP suite divides the file, for example, into "packets" of information of an efficient size. Each packet is separately numbered and includes an indication regarding the destination computing device. The individual packets for a given file may travel through different routes of the network and when they all arrive at the destination computing device, the packets are reassembled into the original file by the TCP layer at the destination computing device.

The term "anti-replay" is specified by the Internet Engineering Task Force (IETF) Internet Protocol Security (IP-Sec) standard. Anti-replay algorithms seek to ensure IP packet-level security by making it impossible for an intruder to intercept network traffic flow packets and insert changed packets into the network traffic flow between a source computing device and a destination computing device. Anti-replay algorithms implemented by the destination maintain a sliding window record of the sequence numbers of validated received packets and discards packets having a sequence number that is lower (i.e., too old) than the lowest maintained in the sliding window or already appears (i.e., duplicates/replays) in the sliding window. Non-limiting examples of anti-replay checks that may be performed on network traffic by a firewall, for example, include: (i) validation of TCP flags, (ii) determining whether a TCP RST packet is part of a RST-flooding attack, (iii) determining whether the packet is part of a TCP Split-Handshake attack, (iv) determining whether the packet is an ICMP packet that is part of a Ping-Flooding attack, (v) determining whether the sequence numbers in TCP headers are valid, and (vi) determining whether the packet breaks the TCP state machine.

The term "anti-replay policy" generally refers to a security policy that specifies characteristics of network traffic and a corresponding anti-replay type indicative of the type of anti-replay checking, if any, that is to be performed for matching network traffic. The characteristics used to identify matching network traffic may include one or more of a source address, a source port, a destination address, a destination port and a protocol. In some embodiments, the anti-replay policy may also identify a corresponding action (e.g., accept or reject) for matching network traffic. In one embodiment, by default anti-replay checks are defined at a global level for all network traffic flows, but can be overridden at the policy level by a matching anti-replay policy. In this manner, a network security administrator is provided greater granularity of control. For example, the network security administrator can selectively disable anti-replay checks for network traffic associated with known automated processes (e.g., proprietary robots, web crawlers, and the like) while maintaining anti-replay checks for other network traffic. In one embodiment, the type of anti-replay can be one of "default," "disable," "loose," and "tight." When set to disable, the matching anti-replay policy causes no anti-replay checks to be performed for the matching network traffic. When set to loose, the anti-replay policy causes a first predefined or configurable subset of anti-replay checks (e.g., only checks (v) and (vi) above) to be performed on the matching network traffic. When set to tight, the anti-replay policy causes a second predefined or configurable subset of anti-replay checks (e.g., all of checks (i) through (vi) above) to be performed on the matching network traffic. When set to default, the matching anti-replay policy causes the anti-replay checks defined at the global level (e.g., disable, loose, or tight) to be performed for the matching network traffic.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments. Numerous modifications, changes, variations, substitutions, and equivalents will be apparent to those skilled in the art, without departing from the spirit and scope of the invention, as described in the claims.

According to various embodiments of the present invention, a network security device protecting a private network, receives a packet associated with a network traffic flow between a source computing device external to the private network and a destination computing device within the private network. In response to receipt of the packet from the source computing device, the network security device determines whether the packet is a first packet of the network traffic flow observed by the network security device. When the determining is affirmative, then the network security device identifies an anti-replay policy associated with the network traffic flow and whether the anti-replay policy is intended to override a global anti-replay policy of the network security device. When the global anti-replay policy is overridden by the identified anti-replay policy, then the network security device performs one or more anti-replay security checks in accordance with the matching anti-replay policy; otherwise, the network security device performs anti-replay security checks, if any, on the packet in accordance with the global anti-replay policy.

According to an implementation, the network security device implements a security setting through anti-replay checks defined using a global anti-replay policy. The global anti-replay policy controls how the network security device performs the anti-replay security checks on passing network packets (e.g., whether the network security device checks loosely or tightly, or whether the network security device does not check at all). To achieve greater granularity control for the anti-replay security checks, the network security device uses an anti-replay policy table, which can override the global anti-replay policy. In an example, when the network traffic flow is observed from automated processes e.g., robots, web crawlers, etc., the anti replay policy table may define a policy to disable the anti-replay security checks for any traffic from such automated processes, thereby overriding the global network policy.

Figure 1:
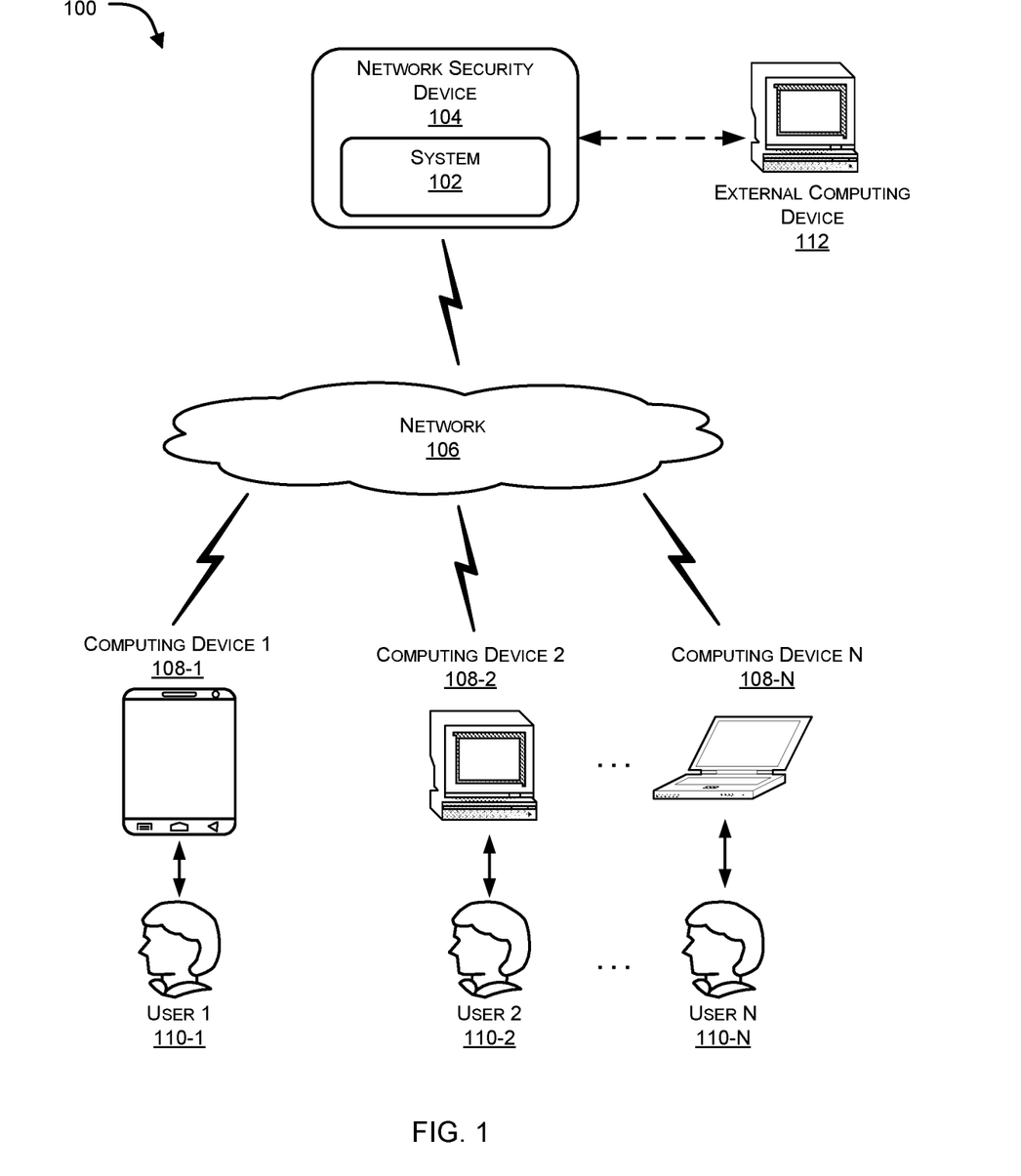
FIG. 1 is network architecture in which aspects of the present invention can be implemented in accordance with an embodiment of the present invention.

FIG. 1 is network architecture 100 in which aspects of the present invention can be implemented in accordance with an embodiment of the present invention. Referring to architecture 100, a system 102 is implemented in a network security device 104 (e.g., a firewall and/or a content filtering device) protecting a private network 106 including multiple computing devices 108-1, 108-2, . . . , 108-N (which may be collectively referred to herein as computing devices 108 or and may be individually referred to herein as computing device 108). Users 110-1, 110-2, . . . , 110-N (may be collectively referred to as users 110 and individually referred to as user 110, hereinafter) of network 106 can interact with computing devices 108, which can include personal computers, smart devices, web-enabled devices, hand-held devices, laptops, mobile phones and the like.

Those skilled in the art will appreciate that, network 106 in architecture 100 can be a wireless network, a wired network or a combination thereof that can be implemented as one of the different types of networks, such as an Intranet, a Local Area Network (LAN), a Wide Area Network (WAN), an Internet, and the like. Further, the network can either be a dedicated network or a shared network. A shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

According to an embodiment, system 102 receives a packet associated with a network traffic flow between an external source computing device 112 and an internal destination computing device 106. Source computing device 112 may implement a non-standard TCP stack in connection with an automated process (e.g., a robot, a web crawler, etc.), that may send the packet to destination computing device 108. For example, the automated process may send the packet with an ACK number being non 0 and an ACK flag not set, which may not pass through system 102 if anti-replay security checks are enabled (e.g., with anti-replay security checks performed loosely or tightly), while the packet can pass through system 102 if the anti-replay security checks are disabled. In one embodiment, system 102 implements an anti-replay policy that may override the global anti-replay policy to selectively disable anti-replay security checks for source computing device 112 or the automated processes initiated by source computing device 112.

According to an embodiment, in response to receipt of the packet from source computing device 112, system 102 may determine whether the packet is a first packet of the network traffic flow observed by system 102. If the packet is not the first packet of the network traffic flow, system 102 may continue to perform anti-replay checks in accordance with previously selected anti-replay policy for the network traffic flow. Conversely, if the packet is the first packet of the network traffic flow, system 102 may identify the anti-replay policy associated with the network traffic flow. System 102 may further identify whether the anti-replay policy is intended to override the global anti-replay policy of network security device 104. The anti-replay policy may indicate a type of anti-replay checking to be performed on a matching network traffic flow in terms of "default," "disable," "loose," or "tight." In one implementation, the anti-replay policy may be identified/matched based on attributes of the packet. Non-limiting examples of the attributes may include a protocol, a source IP address, a destination IP address, a source port and a destination port.

According to an embodiment, if the anti-replay policy is intended to override the global anti-replay policy (e.g., the anti-replay type specified by the anti-replay policy is "disable," "loose," or "tight"), system 102 performs the anti-replay security checks in accordance with the type of anti-replay checking specified by the matching anti-replay policy; otherwise (e.g., the anti-replay type specified by the anti-replay policy is "default"), system 102 performs the anti-replay security checks in accordance with the global anti-replay policy.

Figure 2:
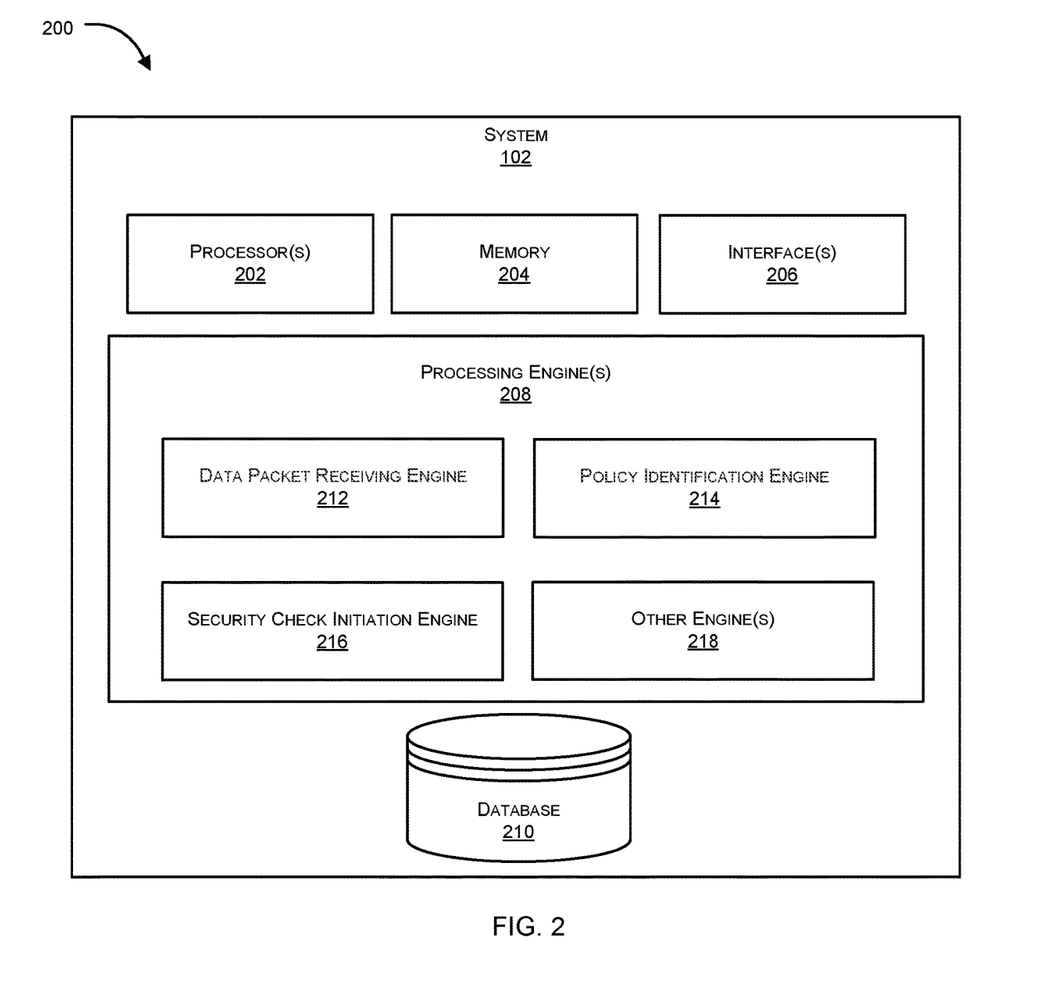
FIG. 2 is a block diagram illustrating functional components of a system in accordance with an embodiment of the present invention.

FIG. 2 is a block diagram 200 illustrating functional components of system 102 in accordance with an embodiment of the present invention. In the context of the present example, system 102 can include one or more processor(s) 202. Processor(s) 202 can be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 204 of the management device 102. Memory 204 can store one or more computer-readable instructions or routines, which may be fetched and executed to create or share the data units over a network service. Memory 204 can include any non-transitory storage device including, for example, volatile memory such as RAM, or non-volatile memory such as EPROM, flash memory, and the like. In an example embodiment, memory 204 may be a local memory or may be located remotely, such as a server, a file server, a data server, and the Cloud.

System 102 can also include one or more Interface(s) 206. Interface(s) 206 may include a variety of interfaces, for example, interfaces for data input and output devices, referred to as I/O devices, storage devices, and the like. Interface(s) 206 may facilitate communication of system 102 with various devices coupled to system 102. Interface(s) 206 may also provide a communication pathway for one or more components of system 102. Examples of such components include, but are not limited to, processing engine(s) 208 and database 210.

Processing engine(s) 208 can be implemented as a combination of hardware and software or firmware programming (for example, programmable instructions) to implement one or more functionalities of engine(s) 208. In the examples described herein, such combinations of hardware and software or firmware programming may be implemented in several different ways. For example, the programming for the engine(s) 208 may be processor executable instructions stored on a non-transitory machine-readable storage medium and the hardware for engine(s) 208 may include a processing resource (for example, one or more processors), to execute such instructions. In the examples, the machine-readable storage medium may store instructions that, when executed by the processing resource, implement engine(s) 208. In such examples, system 102 can include the machine-readable storage medium storing the instructions and the processing resource to execute the instructions, or the machine-readable storage medium may be separate but accessible to system 102 and the processing resource. In other examples, processing engine(s) 208 may be implemented by electronic circuitry. Database 210 can include data that is either stored or generated as a result of functionalities implemented by any of the components of processing engine(s) 208.

In an example, processing engine(s) 208 can include a data packet receiving engine 212, a policy identification engine 214, a security check initiation engine 216, and other engine(s) 218. Other engine(s) 218 can implement functionalities that supplement applications or functions performed by management device 102 or processing engine(s) 208.

According to an embodiment, data packet receiving engine 212 receives a packet associated with a network traffic flow between a source computing device external to a private network and a destination computing device within the private network. The source computing device may implement a non-standard TCP stack for automated processes. For example, the non-standard TCP stack may result in network traffic flow from a source device to a destination device failing to meet standard anti-replay security checks. Certain non-limiting examples of the automated processes include robots and web crawlers.

According to an embodiment, in response to receipt of the packet from the source computing device, policy identification engine 214 may determine whether the packet is a first packet of the network traffic flow observed by system 102. If the packet is not the first packet of the network traffic flow, security check initiation engine 216 may continue to perform anti-replay checks in accordance with previously selected anti-replay policy for the network traffic flow. Alternately, if the packet is the first packet of the network traffic flow, policy identification engine 214 identifies the anti-replay policy associated with the network traffic flow by identifying whether the anti-replay policy is intended to override the global anti-replay policy of network security device 104.

According to an embodiment, if the anti-replay policy is intended to override the global anti-replay policy, security check initiation engine 216 performs the anti-replay security checks in accordance with the anti-replay policy. While if the anti-replay policy is not intended to override the global anti-replay policy, security check initiation engine 216 performs the anti-replay security checks in accordance with the global anti-replay policy.

Figure 3A:
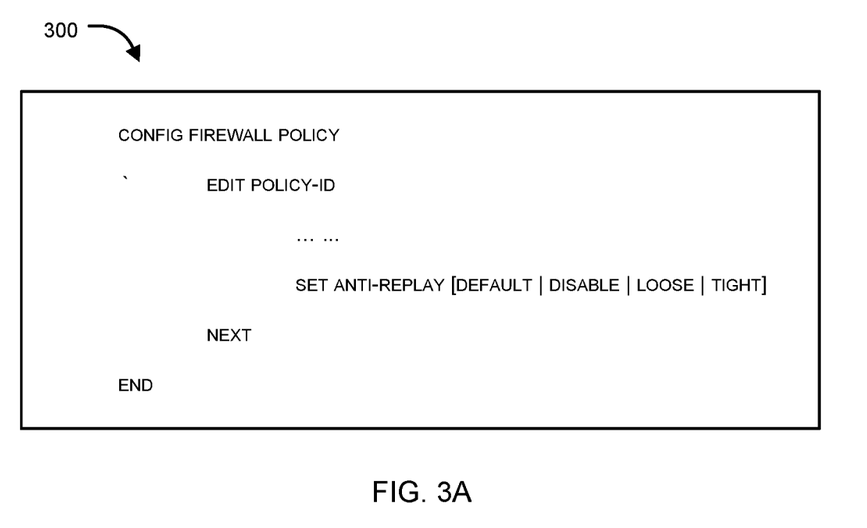
FIGS. 3A-C illustrate exemplary network policies defined in accordance with an embodiment of the present invention.
Figure 3B:
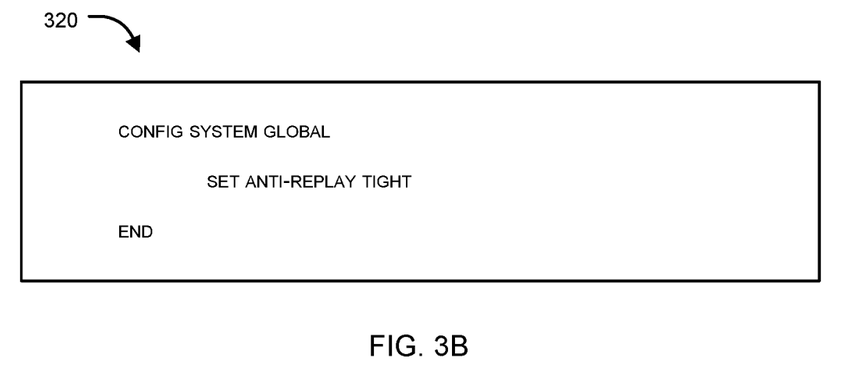
Figure 3C:
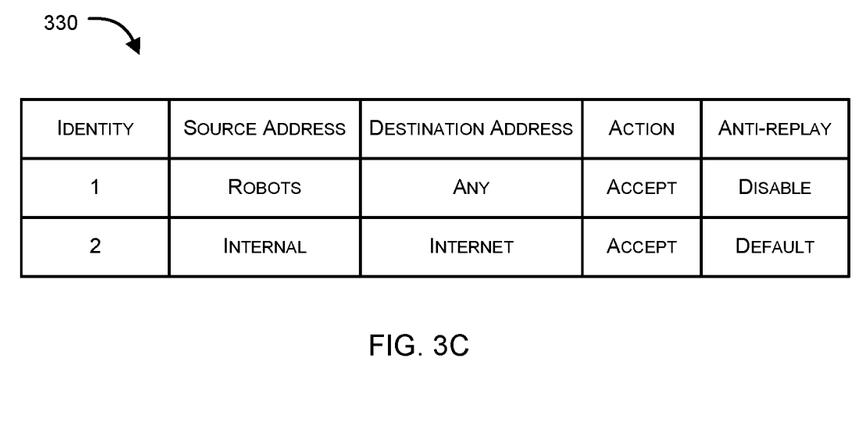

FIGS. 3A-C illustrate exemplary network policies 300, 320 and 330 defined in accordance with an embodiment of the present invention. In the context of the present example, an administrator of a network security device may define an anti-replay policy and/or a global anti-replay policy. These polices may specify the anti-replay type as any of default, disable, loose, or tight so as to cause the network security device to perform an appropriate level of anti-replay security checks on matching network traffic.

According to example 300, the administrator can define value of "anti-replay" in the anti-replay policy as one of "default", "disable", "loose", and "tight" to achieve greater granularity control for anti-replay security checks. If the value of "anti-replay" is set to "default", the network security device may inherit the "anti-replay" type from global anti-replay policy; otherwise, the network security device may perform the anti-replay security checks in accordance with the type specified in the matching anti-replay policy.

In one example 320, the administrator can define the "anti-replay" type for the global anti-replay policy as "tight" so that the network security device performs strict anti-replay security checking, when the checks are not selectively disabled or otherwise overridden at the policy level.

In one example 330, the administrator can define that anti-replay security checks are disabled for any network traffic flow that is being received from robots. However, the anti-replay security checks are performed in accordance with the global anti-replay configuration for any other network traffic flows from an internal source address to an Internet destination address.

Figure 4:
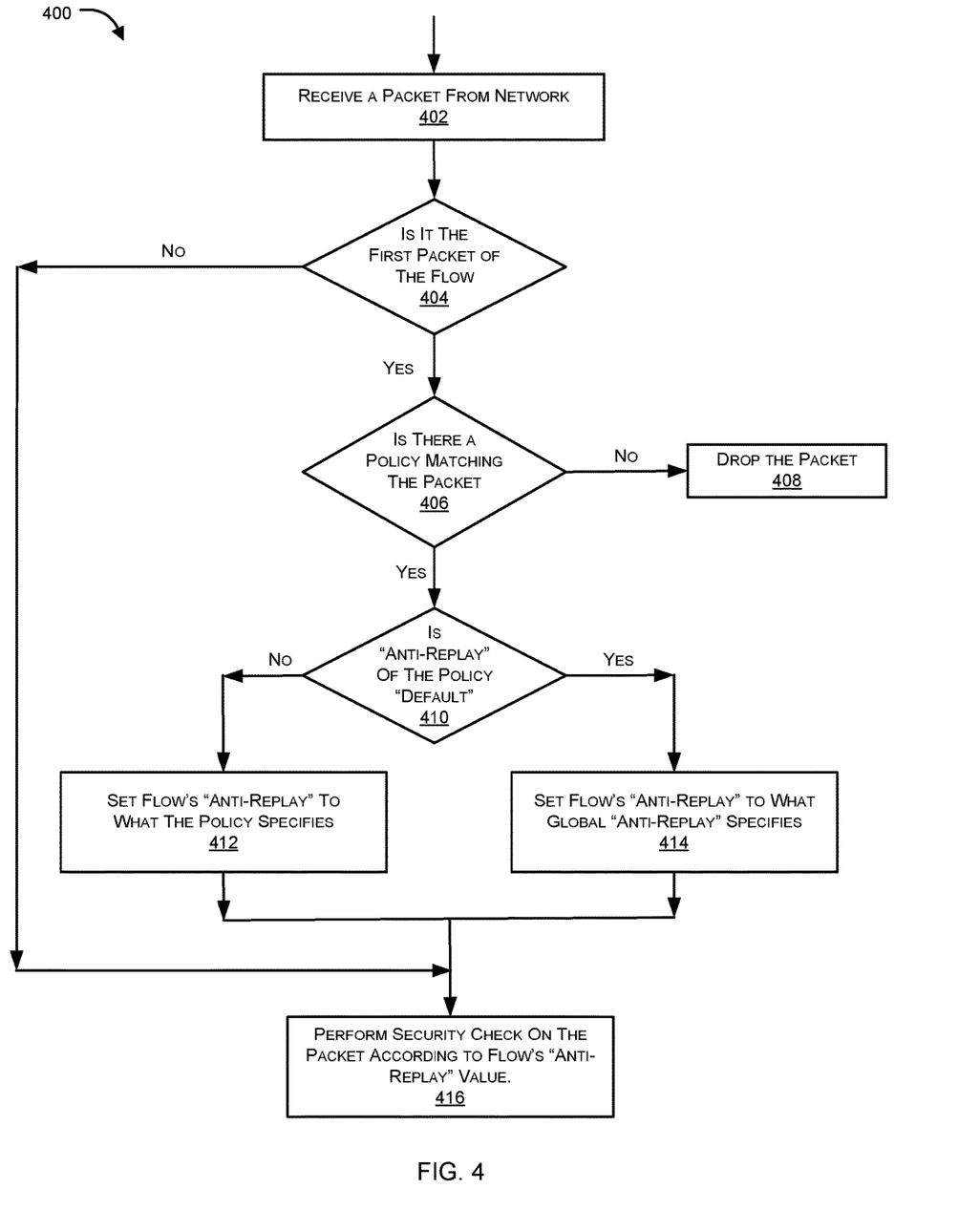
FIG. 4 is a block diagram illustrating workflow of the network security device in accordance with an embodiment of the present invention.

FIG. 4 is a block diagram 400 illustrating workflow of the network security device in accordance with an embodiment of the present invention. The processing described with reference to FIG. 4 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms, such as the network security device 104 illustrated in FIG. 1 and/or the computer system described with reference to FIG. 6 below. For sake of brevity, this flow diagram and the below description focus on processing related to anti-replay checks. Those skilled in the art will appreciate network security devices perform various other operations and processing in connection with handling network traffic.

In the context of the present example, at block 402, a network security device protecting a private network, receives a packet associated with a network traffic flow from an source computing device.

At decision block 404, the network security device determines if the packet is a first packet of the network traffic flow observed by the network security device. If the packet is not the first packet of the network traffic flow, the network security device, at block 416, continues to perform anti-replay security checks according to anti-replay policy of the previously identified network traffic flow. However, if the packet is the first packet of the network traffic flow, the network security device, at decision block 406, identifies if there is an anti-replay policy associated with the network traffic flow. If no anti-replay policy is associated with the network traffic flow, at block 408, the network security device may drop the packet. Otherwise, at decision block 410, the network security device may further identify if the anti-replay policy is set to default. If the anti-replay policy is set to default, the anti-replay policy is not intended to override a global anti-replay policy of the network security device and accordingly, at block 414, the network security device, set's the flows anti-replay type/value to that specified by the global configuration and performs anti-replay security checks in accordance with what the global anti-replay policy specifies. Conversely, if the anti-replay policy is not set to default, the anti-replay policy is intended to override a global anti-replay policy of the network security device and accordingly, at block 412, the network security device sets the flow's anti-replay type/value to that specified by the matching anti-replay policy and thereafter performs the anti-replay security checks for this network flow in accordance with what the matching anti-replay policy specifies. At block 416, the network security device performs the anti-replay security checks in accordance with the anti-replay type determined at block 412 or 414.

Figure 5:
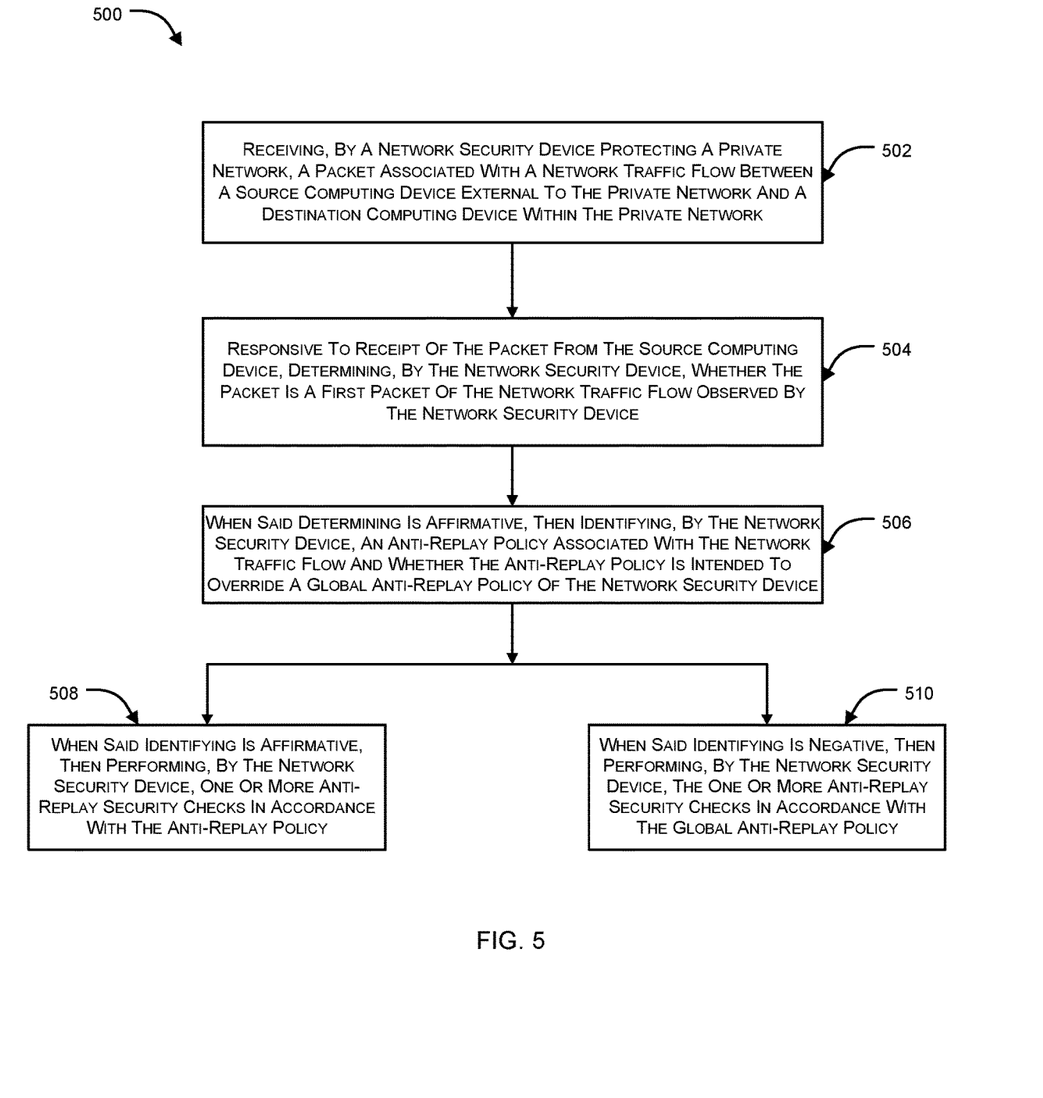
FIG. 5 is a flow diagram illustrating a process for overriding a global anti-replay security check by a policy-based anti-replay security check for a particular session in accordance with an embodiment of the present invention.

FIG. 5 is a flow diagram illustrating a process for overriding a global anti-replay security check by a policy-based anti-replay security check for a particular session in accordance with an embodiment of the present invention. As above, the processing described with reference to FIG. 5 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by a combination of one or more computer systems in physical or virtual form, such as computer system 600 described with reference to FIG. 6.

At block 502, a network security device protecting a private network receives a packet associated with a network traffic flow between a source computing device external or internal to the private network and a destination computing device within the private network.

In response to receipt of the packet from the source computing device, at block 504, the network security device determines whether the packet is a first packet of the network traffic flow observed by the network security device.

When the determining is affirmative, at block 506, the network security device identifies an anti-replay policy associated with the network traffic flow and whether the anti-replay policy is intended to override a global anti-replay policy of the network security device.

When the anti-replay policy is intended to override the global anti-replay policy of the network security device, at block 508, the network security device performs anti-replay security checks in accordance with the anti-replay policy.

When the anti-replay policy is not-intended to override the global anti-replay policy of the network security device, at block 510, the network security device performs the anti-replay security checks in accordance with the global anti-replay policy.

Figure 6:
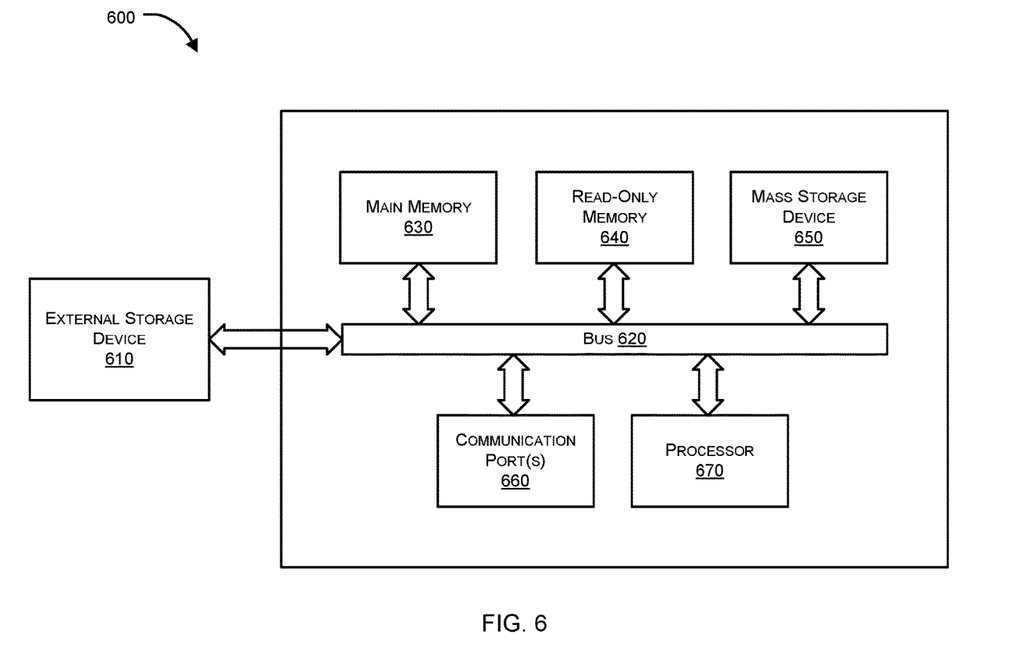
FIG. 6 illustrates an exemplary computer system in which or with which embodiments of the present invention may be utilized.

FIG. 6 illustrates an exemplary computer system 600 in which or with which embodiments of the present invention may be utilized. For example, computer system 600 may represent destination computing device (e.g., computing device 108 with private network 106), source computing device (e.g., external computing device 112) or a subset of computing resources associated with network security device (e.g., network security device 104 or system 102) protecting a private network. While various examples described herein are described with reference to physical computer systems, those skilled in the art will appreciate the functionality and methodologies described herein are equally applicable to computing environments (e.g., a data center or cloud) in which functionality is deployed on virtual machines or as a service in the context of a container, a pod, or other virtualized environment.

As shown in FIG. 6, computer system 600 includes an external storage device 610, a bus 620, a main memory 630, a read only memory 640, a mass storage device 650, a communication port 660, and a processor 670.

Those skilled in the art will appreciate that computer system 600 may include more than one processor 670 and communication ports 660. Examples of processor 670 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 670 may include various modules associated with embodiments of the present invention.

Communication port 660 can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects.

Memory 630 can be Random Access Memory (RAM), or any other dynamic storage device commonly known in the art. Read only memory 640 can be any static storage device(s) e.g., but not limited to, a Programmable Read Only Memory (PROM) chips for storing static information e.g. start-up or BIOS instructions for processor 670.

Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 620 communicatively couples processor(s) 670 with the other memory, storage and communication blocks. Bus 620 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 670 to software system.

Optionally, operator and administrative interfaces, e.g. a display, keyboard, and a cursor control device, may also be coupled to bus 620 to support direct operator interaction with computer system. Other operator and administrative interfaces can be provided through network connections connected through communication port 660. External storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A session method comprising:
 receiving, by a network security device protecting a private network, a packet associated with a session of a network traffic flow between a source computing device and a destination computing device within the private network;
 responsive to receipt of the packet from the source computing device, determining, by the network security device, whether the packet is a first packet of the session observed by the network security device;
 when said determining is affirmative, then identifying, by the network security device, an anti-replay policy associated with the session and whether the anti-replay policy for the session is intended to override a global anti-replay policy of the network security device applicable to all sessions as a default;
 when said identifying is affirmative, then performing, by the network security device, one or more anti-replay security checks in accordance with the anti-replay policy of the session; and
 when said identifying is negative, then performing, by the network security device, the one or more anti-replay security checks in accordance with the global anti-replay policy.

2. The method of claim 1, wherein the anti-replay policy indicates any of a default value, a disable value, a loose value or a tight value.

3. The method of claim 1, wherein the packet is generated by an automated process running on the source computing device and that implements a non-standard Transmission Control Protocol (TCP) stack.

4. The method of claim 1, wherein the anti-replay policy of the session is identified based on one or more attributes of the packet of the session.

5. The method of claim 4, wherein the one or more attributes include a protocol, a source Internet Protocol (IP) address, a destination IP address, a source port and a destination port.

6. The method of claim 1, wherein the anti-replay policy and the global anti-replay policy are defined by an administrator of the network security device.

7. The method of claim 1, wherein the network security device is any or a combination of a firewall and a content filtering device.

8. A non-transitory computer-readable storage medium embodying a set of instructions, which when executed by one or more processors of a network security device, causes the one or more processors to perform a method comprising:
 receiving, by a network security device protecting a private network, a packet associated with a session of a network traffic flow between a source computing device and a destination computing device within the private network;
 responsive to receipt of the packet from the source computing device, determining, by the network security device, whether the packet is a first packet of the session observed by the network security device;
 when said determining is affirmative, then identifying, by the network security device, an anti-replay policy associated with the session and whether the anti-replay policy for the session is intended to override a global anti-replay policy of the network security device applicable to all sessions as a default;
 when said identifying is affirmative, then performing, by the network security device, one or more anti-replay security checks in accordance with the anti-replay policy of the session; and
 when said identifying is negative, then performing, by the network security device, the one or more anti-replay security checks in accordance with the global anti-replay policy.

9. The non-transitory computer-readable storage medium of claim 8, wherein the anti-replay policy indicates any of a default value, a disable value, a loose value or a tight value.

10. The non-transitory computer-readable storage medium of claim 8, wherein the packet is generated by an automated process running on the source computing device and that implements a non-standard TCP stack.

11. The non-transitory computer-readable storage medium of claim 8, wherein the anti-replay policy of the session is identified based on one or more attributes of the packet of the session.

12. The non-transitory computer-readable storage medium of claim 11, wherein the one or more attributes include a protocol, a source Internet Protocol (IP) address, a destination IP address, a source port and a destination port.

13. The non-transitory computer-readable storage medium of claim 8, wherein the anti-replay policy and the global anti-replay policy are defined by an administrator of the network security device.

14. The non-transitory computer-readable storage medium of claim 8, wherein the network security device is any or a combination of a firewall and a content filtering device.

15. A network security device comprising:
- a processor;
- a network interface, communicatively coupled to the processor and to a data network; and
- a memory storing:
  - a new session module to receive a packet associated with a session of a network traffic flow between a source computing device and a destination computing device within the private network, and responsive to receipt of the packet from the source computing device, determine whether the packet is a first packet of the session observed by the network security device;
  - an anti-replay policy override module to, when said determination is affirmative, to identify, by the network security device, an anti-replay policy associated with the session and whether the anti-replay policy for the session is intended to override a global anti-replay policy of the network security device applicable to all sessions as a default;
  - an anti-replay policy execution module to, when said identifying is affirmative, then perform, one or more anti-replay security checks in accordance with the anti-replay policy of the session, and when said identifying is negative, then performing, by the network security device, the one or more anti-replay security checks in accordance with the global anti-replay policy.

* * * * *